United States Patent Office 3,337,230
Patented Aug. 22, 1967

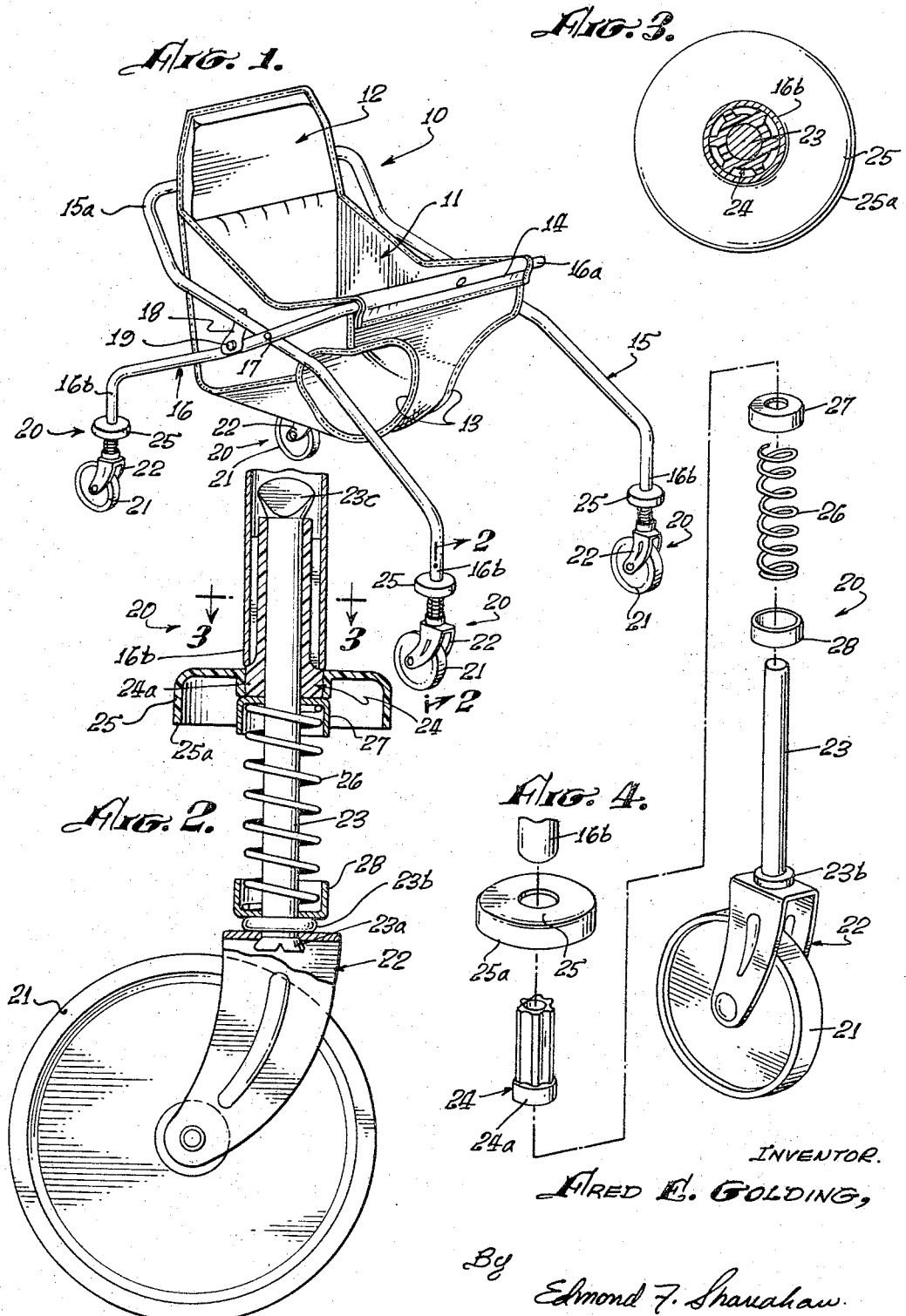

3,337,230
WALKER WITH COMBINATION SWIVELING AND BOUNCING CASTERS
Fred E. Golding, Glendale, Calif., assignor to Aeon Industries, Inc., Glendale, Calif., a corporation of California
Filed Oct. 21, 1965, Ser. No. 499,368
3 Claims. (Cl. 280—87.03)

ABSTRACT OF THE DISCLOSURE

A baby walker which rolls on four casters, each caster being in coil spring suspension on a telescoping leg structure, with caster shaft, coil spring and telescoping assembly on a common axis, and a stop means for restricting certain longitudinal and rotational movements.

---

This invention relates generally to caster-supported baby walkers, and more particularly to a baby walker in which four casters are carried on swiveling shafts which resiliently telescope into tubular legs during free swiveling, to permit simultaneous, independent bouncing and travel movement.

Among the many devices made in the past for the entertainment and muscular training of babies are the well-known walker chairs, supported on casters, and various spring-suspended bouncing seat devices. Obviously, there would be great commercial utility in providing a single device which would combine both the functions of a walker and a bouncing seat. In the past, there has not been any commercially successful device of the type. It has always seemed impossible to combine satisfactorily swiveling caster support for the walker with sufficient resilient vertical movement to provide satisfactory bouncing action. If one attempts to have springing wholly independent of the casters, the close confines of a walker chair structure may place the springs too close to the baby's fingers. Moreover, springing may bring the child too close to the floor during traveling movement. If the spring is incorporated into the swiveling caster, by methods known in the past, it tends to interfere with the free swiveling movement of the caster.

Of course, elaborate support structures known in the construction of motorcycles and other large vehicles might conceivably be employed to achieve the ends desired, but such designs cannot be considered satisfactory solutions since they are economically impossible for commercial acceptance.

It is the primary object of the present invention to provide a baby walker support on resiliently telescoping and swiveling casters of a new, strong, and economical design.

It is another important object of the present invention to provide such a baby walker in which assembly is extremely simple and rugged.

Still another object of the invention is to provide a baby walker which allows the baby to achieve both bouncing and travel movement, simultaneously, without injury to surrounding objects, and without risk to the baby.

The foregoing and other objects are accomplished by means of a folding baby walker, preferably constructed with a tubular frame, which is supported on swiveling casters which resiliently telescope into the tubular frame in the preferred form.

The invention will be best understood from the following description of the preferred embodiment which is illustrated in the accompanying drawings, in which:

FIGURE 1 is a perspective view of a baby walker constructed according to the invention;

FIGURE 2 is an enlarged vertical sectional view of the walker caster, as viewed at a vertical plane through the diameter of the tubular leg of the walker frame, as indicated by the arrows 2—2 in FIGURE 1;

FIGURE 3 is a plan view at a horizontal section through one of the walker legs, as viewed downwardly from a horizontal plane indicated by the arrows 3—3 in FIGURE 2; and FIGURE 4 is a disassembly view of the caster of FIGURES 2 and 3, exploded to illustrate the individual parts in perspective.

In FIGURE 1, the numeral 10 is used to indicate the entire baby walker. A fabric sling seat 11, with a reinforced back 12, and leg holes 13, is slung, by means of fabric loops as indicated at 14, from a frame comprised of a front leg U-frame 15 and a back leg U-frame 16. Preferably, the U-frames 15 and 16 are chrome-plated, formed steel tubes pivoted to each other at a transverse axis by side pivots 17. A preferred construction of the U-frames 15 and 16 is such that they diverge in four directions from the suspended seat 11, so as to provide the baby walker 10 with the greatest stability, and, at their outer ends, turn downwardly to provide a downwardly extending tubular opening, either vertical or slightly diverging outwardly from vertical.

The baby walker 10 is readily foldable for storage or transport, and when unfolded is firmly held in the unfolded position by means of a latch 18, which may be attached to the back part of front leg U-frame 15, and may engage a spring button 19 on the back part of U-frame 16.

It should also be noted that the back part of the front leg U-frame 15 curves upwardly at 15a to provide a firm back support for the seat back 12, and the front bar 16a of the back leg U-frame 16 crosses in front of the baby's position to provide a firm retaining bar for the baby's safety.

The entire walker 10 rolls on four identical swiveling casters 20, which are illustrated in detail in FIGURES 2 to 4.

The caster wheel 21 is rotatably mounted in a yoke 22, which are substantially standard items. Also, the caster shaft 23 is like the shaft of previously known swiveling casters, except for the functions of its upper end, and the manner in which it is telescopically assembled with the leg of the baby walker 10. Ordinarily, the shaft 23 is rigidly fixed to the yoke 22, and is not rotatable therewith. Thus, in the particular form shown, the lower end of shaft 23 has a flattened rivet head 23a and a retaining shoulder 23b.

Shaft 23 both swivels and reciprocates in a sleeve bearing 24, which is preferably made of a plastic material suitable for lightly loaded metal shafts, for example, nylon or the like.

In the perspective view of the exploded assembly in FIGURE 4, it is seen that the preferred form for sleeve 24 is generally tubular, but with radial, longitudinal ribs on the outer surface, which preferably converge upwardly very slightly to permit easy insertion into the open end of the tubular leg 16a. At the lower end of the sleeve 24, an annular shoulder 24a, larger in diameter than the internal cross-section of the leg tube 16a, seats against the open end of tube 16a as seen in the cross-sectional view of FIGURE 2.

The vertical longitudinal length of the shoulder 24a is sufficient to accommodate an encircling bumper or shield 25, which is preferably formed with a depending skirt 25a, and made of resilient plastic material which shields surrounding objects from being scraped by the metal parts of caster 20. It should be noted in this connection that the caster wheel 21 is preferably made of a material which is less likely to damage surrounding objects than metal, or is covered with a tire made of such material; caster wheels made entirely of nylon are satisfactory.

A helical spring 26 encircles the downwardly projecting part of shaft 23, substantially coaxial with it the upper and lower ends of said spring being seated in the concentric spring seat cups 27 and 28.

The upper end of shaft 23, which is straight prior to assembly as shown in the exploded view of FIGURE 4, is swaged or otherwise formed into a retaining shoulder 23c, as seen in FIGURE 2, after assembly, in order to prevent the disassembly of shaft 23 from sleeve 24 under the resilient pressure exerted by helical spring 26.

Preferably the shoulder 23c is formed flat, as illustrated, so as to engage the upper end of sleeve 24 with a pair of radial projections which inhibit swiveling of caster 20 when the walker 10 is unloaded. The advantage of this feature is that the walker 10 is less likely to roll away after the baby has been taken from it, and when it has been parked on an inclined surface. Of course, as soon as the baby is placed in the walker 10, shaft 23 telescopes upwardly a slight distance into the tubular leg 16a and free swiveling is permitted.

It will be seen from the foregoing that the construction of walker 10, with its tubular legs and telescoping casters, permits simultaneous, independent, free swiveling and free bouncing action. While the preferred embodiment contains many refinements and details, and particular selected preferences in details of construction, it is to be understood that the scope of the invention is not limited to all of those details, and it is my intention to comprehend within the scope of this patent all variations, modifications, and improvements which fall within the scope of the appended claims.

It is an important feature of the invention in its preferred form, as illustrated, that the shafts 23, in all four casters 20, are at all times substantially perpendicular to the floor surface. It will be noted that each of the legs of the U-members 15 and 16, although diverging somewhat from the seat 11 for reasons of stability, turn downwardly at their ends to provide for vertical telescoping action. Thus, the free-swiveling and trailing action of the casters 20 occurs smoothly at all times regardless of bouncing action of the infant in the walker 10. Previously known baby walkers of the bouncing type have been characterized by poor swiveling action during bouncing action because they involved movement of the casters kingpin shaft through an arc from the perpendicular during bouncing.

What is claimed is:

1. A baby-walker which includes:
a tubular frame chair structure having four downwardly depending legs, each of said legs being open at the bottom end;
four casters, one mounted in each of said leg openings, each of said casters including;
   a bearing sleeve which is closely received in the interior of one of said legs,
   a swivel shaft closely received in said sleeve, and rotatable and reciprocable therein, and downwardly extending from said sleeve and said tubular leg opening,
   a caster yoke and caster mounted at the lower end of said shaft,
   a helical spring encircling said shaft between said caster and said bearing-sleeve,
   a pair of spring seat cups, one fitted over each end of said helical spring for holding it in compressive position to resiliently resist telescoping of said shaft into said tubular sleeve and said leg opening,
   and a stop means at the upper end of said shaft for limiting the movement of said shaft outward from said sleeve under the pressure of said helical spring, said stop means having frictional engagement means for engaging the upper end of said tubular sleeve and resisting rotation of said shaft when said shaft is fully extended from said sleeve.

2. A baby-walker which includes:
a tubular frame chair structure having four downwardly depending and outwardly diverging tubular legs, of each of said leg tubes being open at the bottom end;
four casters, one mounted in each of said tubular leg openings, each of said casters including;
   a bearing sleeve formed of anti-friction plastic material and having on its outer surface longitudinal ridges projecting radially to an outer circumference which converges upwardly and is closely received in the interior of one of said tubular legs, said ridges resisting rotation of said sleeve therein,
   a swivel shaft closely received in said sleeve, and rotatable and reciprocable therein, and downwardly extending from said sleeve and said tubular leg opening,
   a caster yoke and caster mounted at the lower end of said shaft,
   a helical spring encircling said shaft between said caster and said bearing sleeve,
   a pair of spring seat-cups, one fitted over each end of said helical spring for holding it in compressive position to resiliently resist telescoping of said shaft into said tubular sleeve and said leg tube,
   and a stop means at the upper end of said shaft for limiting the movement of said shaft outward from said sleeve under the pressure of said helical spring, said stop means having frictional engagement means for engaging the upper end of said tubular sleeve and resisting rotation of said shaft when said shaft is fully extended from said sleeve.

3. A baby-walker which includes:
a tubular frame chair structure having four downwardly depending and outwardly diverging tubular legs, each of said leg tubes being open at the bottom end;
four casters, one mounted in each of said tubular leg openings, each of said casters including;
   a bearing sleeve formed of anti-friction plastic material and having on its outer surface longitudinal ridges projecting radially to an outer circumference which is closely received in the interior of one of said tubular legs, said ridges resisting rotation of said sleeve therein,
   a swivel shaft closely received in said sleeve, and rotatable and reciprocable therein, and downwardly extending from said sleeve and said tubular leg opening,
   a caster yoke and caster mounted at the lower end of said shaft,
   a helical spring encircling said shaft between said caster and said bearing-sleeve to resiliently resist telescoping of said shaft into said tubular sleeve and said leg tube, a stop means at the upper end of said shaft for limiting the movement of said shaft outward from said sleeve under the pressure of said helical spring;

and a circular bumper received on the end of said sleeve between the end of said tubular leg and one of said spring seat-cups, said bumper having a resilient peripheral skirt to shield surrounding objects from contact with adjacent parts of said leg and said caster.

References Cited

UNITED STATES PATENTS

| | | | |
|---|---|---|---|
| 2,042,525 | 6/1936 | Herold | 16—44 |
| 2,435,022 | 1/1948 | Troendle | 280—7.1 |
| 2,634,791 | 4/1953 | Weirich | 280—7.1 |
| 3,059,963 | 10/1962 | Hamilton et al. | 297—5 |
| 3,194,577 | 7/1965 | Berlin | 597—5 |

FOREIGN PATENTS

| | | |
|---|---|---|
| 853,716 | 11/1960 | Great Britain. |
| 437,862 | 1/1948 | Italy. |

LEO FRIAGLIA, *Primary Examiner.*